Oct. 7, 1958    C. A. DAVIS ET AL    2,854,997
COOLING APPARATUS AND VALVE THEREFOR
Filed Feb. 1, 1956

*INVENTOR.*
CLARENCE G. DUENKE
CHARLES A. DAVIS
BY Kenneth W. Miller
ATTORNEY.

United States Patent Office 2,854,997
Patented Oct. 7, 1958

2,854,997

COOLING APPARATUS AND VALVE THEREFOR

Charles A. Davis, Mansfield, Ohio, and Clarence G. Duenke, Webster Groves, Mo., assignors to The Ohio Brass Company, Mansfield, Ohio, a corporation of New Jersey Application February 1, 1956, Serial No. 562,700

5 Claims. (Cl. 137—546)

This invention relates to cooling apparatus for electrical equipment, and more particularly to a valve which is adapted for use in such equipment.

In the electrical arts, it is the practice to provide housings for transformers, circuit breakers, and the like in order that the contained apparatus may be immersed in an oil or other coolant. This housing is then provided with external fittings in order that the oil may be circulated through radiators for cooling, through filters for cleaning the oil, and for drainage of the coolant.

In such arrangements, it is essential that the oil or coolant be kept free of impurities such as water, dirt, sludge, and the products of decomposition of the coolant. Extreme precaution must be taken to rid the oil or coolant of such impurities which may otherwise produce short circuits and result in extensive damage to expensive equipment.

It has been found that the extent to which the impurities can be eliminated is limited by reason of the accumulation of dirt and sludge at the bottom of the housing. Particularly, where valves are attached to the bottom of the housing for connection to filtering apparatus, the inlet to the valve is necessarily disposed a short distance above the bottom wall of the housing and a residual part of the oil remains in the bottom of the housing. Consequently, a portion of the impurities is not removed by the external filters.

Certain manufacturers have utilized various accessory fittings whereby the valves were offset from the transformer housing with the inlet of the valve disposed below the bottom of the transformer housing, but the substantial additional cost of the fittings has mitigated against the general adoption of such expedients.

In accordance with the present invention, there is provided a single valve which is so designed and constructed that the drainage of oil from the transformer housing, and filtering of the oil, is completely accomplished. Specifically, we have conceived that a partition in a globe valve, in which the partition separates the body of the valve into inlet and outlet chambers and is disposed below the level of the bottom of the transformer housing, eliminates the need for the accessory fittings heretofore referred to. The body of the valve is so constructed that the inlet extends upwardly above the partition and the body is provided with a flange so that the valve may be attached directly to the transformer housing.

Important specific features of the valve consist of a design arrangement whereby a sampling device may be arranged to communicate with either the inlet or the outlet of the valve so that the necessity of separate types of valves and their attendant cost is obviated, together with a design arrangement whereby sediment which may accumulate at the bottom of the valve may be removed from the valve without disassembly of the oil circulating apparatus.

Accordingly, it is a principal object and purpose of the invention to improve and simplify the cooling or liquid containing apparatus of transformers, circuit breakers, and the like.

It is another object of the invention to simplify and expedite the manufacture of transformers, circuit breakers, and the like, and to reduce the cost of auxiliary cooling and oil circulating apparatus.

It is still another object of the invention to provide a valve which is particularly adapted to facilitate the draining of liquid holding containers.

The invention will be more clearly understood by reference to the following detailed specification and claims taken in connection with the appended drawings, in which Fig. 1 is a vertical sectional view of the valve of the invention, and a portion of a transformer housing with which the valve is associated;

Figure 1:
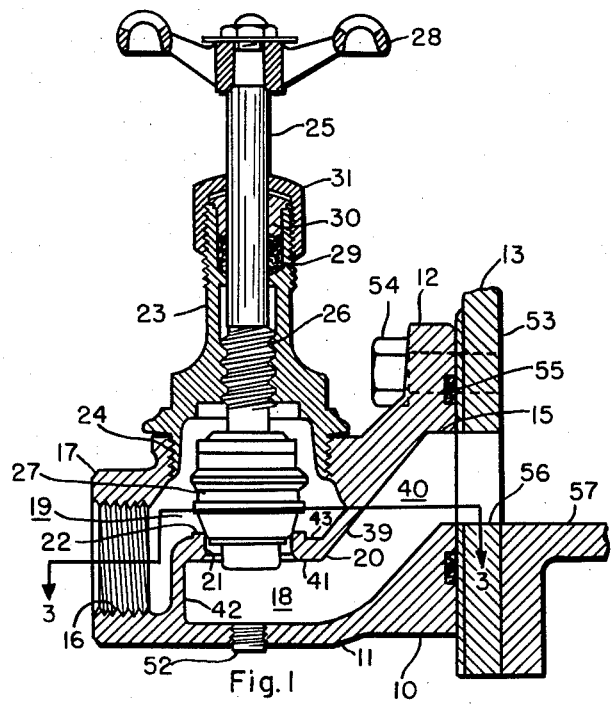

Referring now to the drawings, the valve 10 of the invention comprises a unitary body 11 formed with a flange 12 at the inlet end thereof for attachment to a transformer housing 13 or the like. The flange 12 is provided with openings 14 to receive suitable studs or other mounting fixtures.

The valve 10 has an inlet opening 15 and an outlet opening 16, the latter disposed in an outlet part 17 of the body. The interior of the body is divided into two parts, namely an inlet chamber 18 and an outlet chamber 19, by a partition 20. The partition 20 has a valve opening 21 formed in a horizontal part thereof and a valve seat 22 integral with the top side of the partition about the opening.

A valve bonnet 23 is threaded into an opening 24 in the upper part of the valve body 11 and supports a valve stem 25. The bonnet 23 and valve stem 25 are provided with cooperating threads 26 for advancing and retracting the stem and moving the valve piece 27 into and out of engagement with the valve seat 22 when the handle 28 is turned.

The valve bonnet 23 is sealed with respect to the valve stem at its upper end by means of a packing gland 29 which is held by means of a packing gland follower 30, and compressed by a packing nut 31.

The valve piece 27 comprises a valve disc 32, preferably of nylon or similar material, which is supported by a disc holder 33. The disc holder 33 is held against the lower end of the stem 25 by means of a disc retaining nut 34 and an adapter 35 which is threaded on the holder 33 and receives the nut 34. The stem 25 is provided, at its lower end, with a flange 36 and a cylindrical portion 37 which cooperates with the interior of the disc retaining nut 34 so that the entire valve piece may be arranged to turn on the lower end of the stem.

The partition 20 is constructed with an inclined portion 39 and forms with the remainder of the body and inlet passage 40 to connect the inlet opening 15 with the inlet chamber 18. The inclined portion 39, the horizontal portion 41, and a vertical portion 42 of the partition 20 is such that the body 11 may be cast in a single part and the necessary machining of the valve opening and the valve seat may be accomplished through the opening 24.

Figure 3:
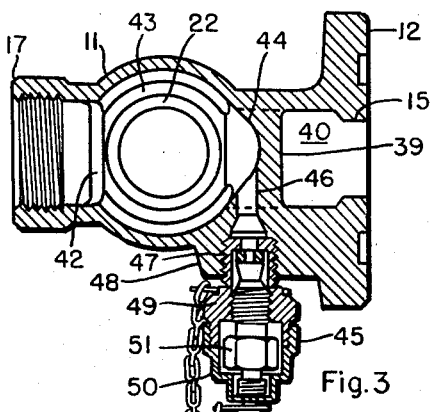
Fig. 3 is a sectional view of the valve body taken in the direction 3—3 in Fig. 1.
Figure 2:
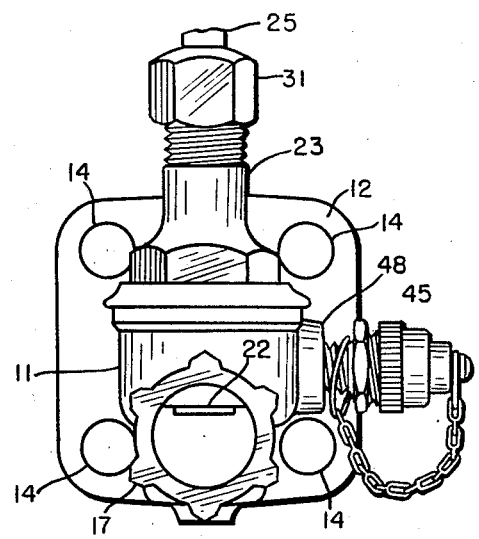
Fig. 2 is a left-end view of the valve of Fig. 1.
Figure 4:
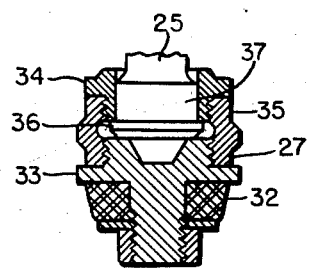
Fig. 4 is a vertical sectional view taken through the valve piece of the valve of Figs. 1 to 3 inclusive.

As shown particularly in Fig. 3, the top side of the horizontal portion 41 of the partition 20 is machined to form the valve seat 22 and with a groove 43 surrounding the valve seat. The recessed portion 44 of the body 11 constitutes a part of the original casting and provides communication with a sampler 45 by means of an opening 46 which is drilled into the body from the exterior thereof. The sampler 45 is received in a threaded opening 47 which is formed in a boss 48 integral with the body 11.

The sampler 45 is of a known construction and constitutes a shell 49, a cover 50, and a threaded plug 51, which latter may be loosened to permit oil to flow from the outlet chamber 19 of the valve.

The upper extremity of the valve seat 22 is disposed below the level of the inlet opening 15 so that when the valve is in an open position, the oil or other liquid may drain from the inlet passage down to the level of the valve seat. A drain plug 52 is provided in the bottom of the body to permit removal of any sediment or the like which might accumulate in the inlet chamber.

In use, the valve 10 is secured to the side wall 53 of the transformer housing 13 by suitable means such as a bolt 54, and a gasket 55 is provided for forming an oil tight seal. The inlet opening 15 is aligned with a drain opening 56 which is flush with the inner surface of the bottom 57 of the housing.

By reason of the relative disposition of the inlet opening 15, the inlet passage 40, the inlet chamber 18, the outlet opening 16, and the partition 20, the oil is completely drained from the housing 13 through the valve 10. Likewise, any sediment which accumulates in the inlet chamber 18 may be removed by opening the drain plug 50. Complete circulation of all the oil in the transformer is, therefore, assured.

All of the aforesaid operations may be accomplished when draining the transformer and, alternatively, when the oil in the transformer is to be filtered, filtering of all the oil in the transformer is insured. Likewise, the sampling device 45 permits a constant check on the condition of the oil flowing through the valve.

It is an advantageous feature of the design of the body of the valve that a single casting may be utilized to provide either a valve in which the sampling device 45 communicates with the outlet or a valve in which the sampling device communicates with the inlet of the valve. As shown particularly in Fig. 3, the opening 46 may be formed by drilling horizontally from the opening 47 through the body to communicate with the outlet chamber 44. However, the passage of 46 may be omitted and an opening formed by drilling from the inlet 15 through the body into the opening 47. The opening then forms a passage from the inlet to the sampling device 45 and the oil or coolant may be sampled at the inlet of the valve rather than at the oulet. In ordinary practice, inlet sampling is utilized on circuit breakers, whereas outlet sampling is utilized on transformers.

It is to be understood that the foregoing description is not intended to restrict the scope of the invention and that various rearrangements of the parts and modifications of the design may be resorted to, giving effect to a liberal interpretation to the claims as herein set forth.

We claim:

1. Liquid containing apparatus for electrical equipment comprising an electrical apparatus housing having a side wall and a bottom wall and an opening in the side wall level with the bottom wall, a valve having a flange positioned against the side wall and an inlet opening aligned with the opening in the side wall, and means compressively securing the flange against the side wall, the valve comprising a body having an internal partition integral with the body with a horizontal part entirely below the level of the inlet opening of the valve and the opening in the wall of the housing and a valve opening in the horizontal part of the partition, a valve seat integral with the partition about the valve opening, an inlet chamber constituted by the partition and the body of the valve and disposed below the level of the bottom wall and an inlet passage extending diagonally upward beyond the partition connecting the inlet opening with the inlet chamber, an outlet chamber constituted by the partition and the body and communicating with the inlet chamber through the valve opening, an outlet opening and a passage connecting the outlet opening with the outlet chamber, a stem opening in the body above the valve opening and a bonnet threaded on the body, a stem supported by the bonnet and means for moving the stem relative to the bonnet, and a valve piece carried at the lower end of the stem and engageable with the valve seat to open and close the valve opening.

2. The invention in accordance with claim 1 in which the interior of the body is open and the partition extends upwardly from the bottom of the interior of the body adjacent the outlet opening, horizontally across and then diagonally upward toward the inlet opening, to constitute the outlet passage, the outlet and inlet chambers, and the inlet passage respectively.

3. The invention in accordance with claim 1 in which the body has a drain plug at the bottom thereof for removing sediment received by the inlet chamber from the bottom of the housing.

4. As an article of manufacture, a valve for use with a liquid container comprising a valve body having a flange and an inlet opening in the flange, an internal partition integral with the body with a horizontal part entirely below the level of the inlet opening of the valve, and a valve opening in the horizontal part of the partition, a valve seat integral with the partition about the valve opening, an inlet chamber constituted by the partition and the body below the partition, and an inlet passage extending diagonally upward beyond the partition connecting the inlet opening with the inlet chamber, an outlet chamber constituted by the partition and the body above the partition and communicating with the inlet chamber through the valve opening, an outlet opening and an outlet passage connecting the outlet opening with the outlet chamber, a stem opening in the body above the valve opening and a bonnet threaded on the body, a stem supported by the bonnet and means for moving the stem relative to the bonnet, and a valve piece carried at the lower end of the stem and engageable with the valve seat to open and close the valve opening.

5. The invention in accordance with claim 4 in which the interior of the body is open and the partition extends upwardly from the bottom of the interior of the body adjacent the outlet opening, horizontally toward the inlet opening and then diagonally upward to constitute the outlet passage, the outlet and inlet chambers and the inlet passage respectively.

References Cited in the file of this patent

UNITED STATES PATENTS

| Number | Name | Date |
|---|---|---|
| 472,530 | Dwight | Apr. 12, 1892 |
| 1,537,948 | Katzin | May 19, 1925 |
| 1,825,543 | Redding | Sept. 29, 1931 |
| 1,954,597 | Mullen | Apr. 10, 1934 |
| 2,000,246 | Neely | May 7, 1935 |
| 2,059,078 | Allred | Oct. 27, 1936 |